United States Patent [19]
Simpson et al.

[11] Patent Number: 5,999,882
[45] Date of Patent: Dec. 7, 1999

[54] METHOD AND SYSTEM OF PROVIDING WEATHER INFORMATION ALONG A TRAVEL ROUTE

[75] Inventors: Danny L. Simpson, Elkhorn; Thomas F. Tascione; Rick P. Reagan, both of Bellevue; David M. Ben-Yaacov, Omaha, all of Nebr.

[73] Assignee: Sterling Software, Inc., Dallas, Tex.

[21] Appl. No.: 08/869,187

[22] Filed: Jun. 4, 1997

[51] Int. Cl.[6] .................................................. G06F 19/00
[52] U.S. Cl. ...................................................... 702/3
[58] Field of Search ............................................ 702/3, 4

[56] References Cited

U.S. PATENT DOCUMENTS

| | | | |
|---|---|---|---|
| 4,521,857 | 6/1985 | Reynolds, III | 364/439 |
| 5,220,507 | 6/1993 | Kirson | 701/207 |
| 5,379,215 | 1/1995 | Kruhoeffer et al. | 364/420 |
| 5,568,385 | 10/1996 | Shelton | 364/420 |
| 5,598,359 | 1/1997 | Montag et al. | 364/578 |
| 5,648,768 | 7/1997 | Bouve | 701/207 |
| 5,802,526 | 9/1998 | Fawcett et al. | 707/104 |

OTHER PUBLICATIONS

Emery et al., "Online Access to Weather Satellite Imagery and Image Manipulation Software", IEEE Pacific Rim Conference on Communications, Computers, and Signal Processing, May 17–19, 1995, pp. 2–10.

Gilhousen, D.B., "Methods of Obtaining Weather Data in Real Time", IEEE Proceedings Oceans' 88. A Partnership of Marine Interests, pp. 1341–1343 vol. 4, Conference held Oct. 31–Nov. 2, 1988.

Whitehouse, K., "Weather Without The Weatherman [on the World Wide Web]", IEEE Computer Graphics and Applications, vol. 16, Iss. 2, Mar. 1996, pp. 12–15.

Primary Examiner—Donald E. McElheny, Jr.
Attorney, Agent, or Firm—Baker & Botts, L.L.P.

[57] ABSTRACT

A system (10) for providing weather information along a travel route may comprise a client system (14) and a server system (12). The client system (14) may receive and upload the travel route to the server system (12). The server system (12) may automatically retrieve weather data (74) associated with the travel route and use data to automatically generate a visualization (76) of weather along the travel route. The server system (12) may download the weather data (74) and visualizations (76) to the client system (14) for display.

73 Claims, 6 Drawing Sheets

Select Terminal & Product

ICRU:
KOMA Omaha Eppley ▽

Observations:
- ○ Imagery
- ○ Upper Air
- ○ AIRNET
- ○ SIGNET
- ○ METAR
- ○ NOTAM
- ○ PIREP
- ● Surface Observation
- ○ Severe Weather Forecasts:
- ○ TAP
- ○ Aviation Map
- ○ Winds Aloft
- ○ Jet Stream
- ○ Short Term
- ○ Coded City
- ○ State
- ○ Area
- ○ TWED

ASOS Weather Observation

ORCA RS 1755 AO2A M19W OWC 1R − F 125/36/34/2116024/990
R29LWR.10V50 CIG 16V22 TWR WSBY 2 PK WND 2032/1732 PRESPR 2RNO

| | |
|---|---|
| LOCATION IDENTIFIER | KDMA |
| NAME | Omaha Eppley |
| REPORT TYPE | Scheduled Report/Special Observation |
| TIME | 17:55 UTZ |
| STATION TYPE | Attended ASOS |
| SKY CONDITION & CEILING | Measured ceiling 1900 ft variable Dellbar 12,000ft.AcCL |
| VISIBILITY | 1 stature mile(s) |
| PRESENT WEATHER | Rain |
| OBSTRUCTIONS TO VISION | Fog |
| SEA-LEVEL PRESSURE | 125 millieters (1012.5 HPa) |
| TEMPERATURE | 36° F |
| DEW POINT | 34° F |
| WIND DIRECTION | 210° true |
| SPEED | 16−24 knots |
| CHARACTER | Gusts |
| ALTIMETER SETTING | 29.90 in |
| MISSING DATA | None |
| DENSITY ALTITUDE | Voice broadcast only |
| REMARKS | Runway 25L visual range 1000 variable to 5000 ft. Ceiling 1000 variable to 220 ft. tower visibility 2 miles, peak wind 200° true at 32 knots at 17:32 UTC, pressure falling rapidly. |
| STATUS REMARKS | Freezing rain information not available |

RETURN

METHOD AND SYSTEM OF PROVIDING WEATHER INFORMATION ALONG A TRAVEL ROUTE

TECHNICAL FIELD OF THE INVENTION

This invention relates generally to travel planning, and more particularly to a method and system of providing weather information along a travel route.

BACKGROUND OF THE INVENTION

Modern weather forecasting and planning utilizes a wide variety of weather information from a plurality of sources. Such weather information may include satellite imagery, radar imagery, alpha-numeric text such as temperatures, rainfall, barometer readings, and the like. This information may be collected by orbiting satellites, regional and ground stations, and direct observations.

Meteorological and aviation professionals in the military, commercial, and private sectors utilize a wide range of weather information to prepare flight plans. Collecting weather information relevant to a flight path, however, is problematic in that the data is collected and stored by region or area, not by path. Moreover, to obtain a full range of weather information, a number of different systems must generally be accessed.

SUMMARY OF THE INVENTION

Accordingly, a need has arisen in the art for an improved weather system and method of travel planning. The method and system of the present invention provide weather information along a travel route that substantially reduce or eliminate disadvantages and problems associated with prior weather systems.

In accordance with the present invention, a server may provide weather information along a travel route. The server may comprise a server application, a display engine, and a rendering engine. The server application may receive a travel route over a network. The display engine may automatically retrieve weather data associated with the travel route. The rendering engine may automatically generate a visualization of weather along the travel route using the weather data.

More specifically, in accordance with one embodiment of the present invention, the weather data may include alpha-numeric data, satellite imagery, radar imagery, and weather observations along the travel route. The weather visualization may include two and three-dimensional fly-throughs of the travel route.

In accordance with another aspect of the present invention, a client system may connect to the server system via the network. The client system may receive and upload the travel route over the network to the server system. The server system, in turn, may obtain and download the weather data and visualization to the client system for display.

In one embodiment, the client system may include a user interface to receive the travel route. The user interface may comprise an interactive map having a plurality of travel points. In this embodiment, the travel route may be received by a selection of a first travel point as a departure point and a second travel point as a destination point. One or more way points between the departure and destination points may also be received.

Important technical advantages of the present invention include providing weather information along a travel route and/or for a selected location. The travel route may be a flight path, a shipping lane, a truck route and the like. In particular, a plurality of points may be generated along a travel route or for the location entered by a client. Weather data may then be retrieved for each point. Accordingly, a client may easily and conveniently obtain weather information along a travel route or for a selected location.

Another technical advantage of the present invention include providing visualizations of weather along the travel route or for the selected location. In particular, weather visualizations along the travel route or for the selected location may be generated using the weather data associated with the travel route or selected location. For a flight path travel route, the weather visualizations may include two and three-dimensional fly-throughs. Accordingly, the present invention provides visualizations that simulate weather conditions along the travel route or for the selected location.

Still another technical advantage of the present invention includes providing a weather information system that can be remotely accessed by a client. In particular, a client system may receive and upload the travel route or selected location over a network to a server system. The server system may automatically retrieve the weather data associated with the travel route or selected location and generate the weather visualizations using the weather data. The server system may download the weather data and visualizations over the network to the client system for display. Accordingly, a client may remotely enter a travel route or location and receive weather data and weather visualizations along that travel route or for the selected location.

Yet another technical advantage of the present invention includes providing a user interface with which a client may intuitively enter the travel route or select a location. In particular, the interface may comprise an interactive map having a plurality of points. For the travel route, the client may select a first travel point as a departure point and a second travel point as a destination point. The client may also select points between the departure and destination points as way points. For the location, the client may select one or more points. Accordingly, the client may intuitively enter the travel route or location by simply selecting points on a map.

Other technical advantages will be readily apparent to one skilled in the art from the following figures, descriptions, and claims.

BRIEF DESCRIPTION OF THE DRAWINGS

For a more complete understanding of the present invention and its advantages thereof, reference is now made to the following brief description, taken in conjunction with the accompanying drawings and detailed description, wherein like reference numerals represent like parts, in which.

DETAILED DESCRIPTION OF THE INVENTION

The preferred embodiments of the present invention and its advantages are best understood by referring now in more detail to FIGS. 1–9 of the drawings, in which like numerals refer to like parts throughout the several views. FIGS. 1–9 illustrate a method and system of providing weather data along a travel route or at a selected location. A travel route may be a flight path, a shipping lane, a truck route or the like.

As described in more detail below, the system may be a distributed system having client and server components. The client may receive and upload a travel route or selected location over a network to the server. The server may automatically retrieve weather data associated with the travel route or selected location and generate visualization of weather along the travel route or for the selected location using the weather data. The server may download the weather data and visualizations over the network to the client for display. Accordingly, graphical information and visualizations that stimulate the formation of mental images of weather conditions and other weather data along a travel route or for a selected location may be easily and conveniently obtained by a remote client. Moreover, the travel route or selected location may be intuitively entered by simply selecting departure and destination points on an interactive map.

Figure 1:
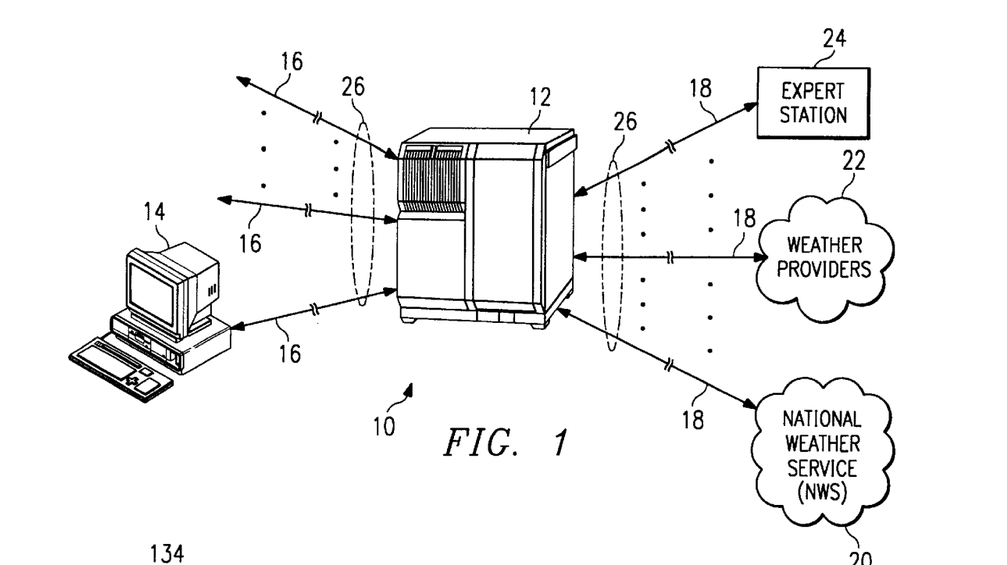
FIG. 1 is a schematic diagram illustrating a distributed weather information system in accordance with one embodiment of the present invention.

FIG. 1 illustrates a distributed weather information system 10 in accordance with one embodiment of the present invention. It will be understood that the weather system 10 may be otherwise configured within the scope of the present invention. For example, the weather system 10 may be configured as a stand alone system.

As shown by FIG. 1, the weather information system 10 may comprise a server system 12 connected to one or more client systems 14 through communication links 16. The server system 12 may be a computer such as a personal computer, file server, workstation, minicomputer, mainframe or any other computer capable of communicating and interconnecting with other computers.

As described in more detail below, the server system 12 may include an input/output system, processor and memory. The input/output system may connect the communication links 16 and other input and output devices to the server system 12. The communication links 16 may be directly connected to the server system 12 or may be connected through a data transmission device such as a modem or the like. The input devices may include a pointing device such as a mouse or trackpad, a keyboard, or the like. The output devices may include a monitor, a printer, or the like.

The server system 12 may be connected to a plurality of other server systems through communication links 18. As previously described in connection with the communication links 16, the input/output system may connect the communication links 18 to the server system 12. The communication links 18 may be directly connected to the server system 12 or may be connected through a data transmission device such as a modem or the like. It will be understood that communication links 16 and 18 may be otherwise connected to the server system 12 within the scope of the present invention.

The server system 12 may communicate and obtain weather data over communication links 18. In one embodiment, the server system 12 may be connected to the National Weather Service (NWC) 20, other weather provider servers and/or networks 22, and the like. The server system 12 may also be connected to an expert station 24. It will be understood that additional or different systems may be connected to the server system 12 through communication links 18 within the scope of the present invention.

Communication links 16 and 18 may be any type of communication link capable of supporting data transfer. In one embodiment, the communication links 16 and 18 may include any combination of an Integrated Services Digital Network (ISDN) communication line, a hardwire line, or a telephone link. It will be understood that the communication links 16 and 18 may comprise other types of links, including wireless links such as microwave, radio frequency (RF) and the like, within the scope of the present invention.

The communication links 16 and 18 may form one or more networks 26. In one embodiment, the network 26 may be the Internet in which information may be transmitted and retrieved using the World Wide Web (WWW) or similar system. It will be understood that the present invention is not limited to network implementations using the Internet. Thus, the network 26 may be any interconnection found on any computer network such as a local area network (LAN), a wide area network (WAN), a corporate or other intranet, or any other communications and data exchange systems created by connecting two or more computers.

In the Internet embodiment, the server system 12 may be remote from the client system 14 and located anywhere in the world. As part of the Internet, communication links 16 may connect to intermediate servers between the server system 12 and the client system 14. Thus, a plurality of intermediate servers may be disposed between the client system 14 and the server system 12 along communication links 16.

The client system 14 may communicate over the Internet with the server system 12 using a Web browser or other application that provides an address or Uniform Resource Locator (URL) of the server system 12. The client system 14 may access the server system 12 through a plurality of other server systems using HyperText Transfer Protocol (HTTP) and providing the URL to the other server systems. HTTP is an application network protocol that governs how content is obtained across the World Wide Web. HTTP is stateless in a sense that the server does not store or record any information about the history or status of its interaction with a given client. Eventually, the server system 12 is found and data may be transmitted between the server and client systems 12 and 14 using Transmission Control Protocol/Internet Protocol (TCP/IP) for transport of data. It will be understood that client system 14 may otherwise communicate and/or interact with the server system 12 within the scope of the present invention. For example, the client system 14 and the server system 12 may communicate using Virtual Reality Modeling Language (VRML) or the like.

The client system 14 may be similar to the server system 12 and may be implemented using virtually any type of computer. As described in more detail below, the client system 12 is preferably a personal computer having an input/output system, a processor, and a memory. As previously described in connection with the server system 12, the input/output system may connect the communication links 16 and other input and output devices to the client system 14.

Figure 2:
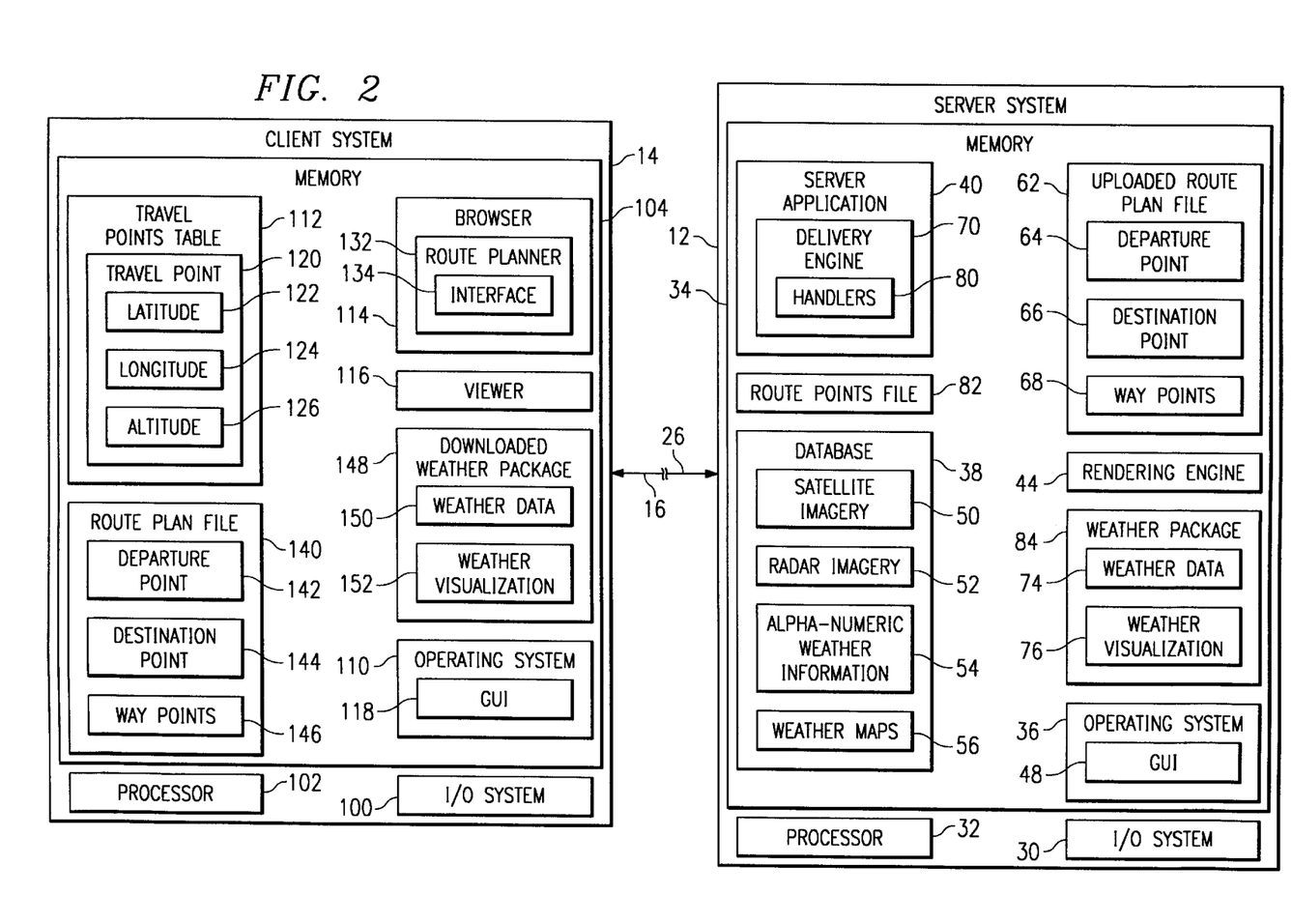
FIG. 2 is a schematic block diagram illustrating client and server components of the weather information system of FIG. 1 in accordance with one embodiment of the present invention.

FIG. 2 is a schematic block diagram illustrating components of the server system 12 and client system 14 in accordance with the one embodiment of the present invention. As shown in FIG. 2, the server system 12 may comprise an input/output system 30, a processor 32 and a memory 34. As previously described, the input/output system 30 may connect communication links 16 and 18 and other input and output devices to the server system 12.

The server system 12 includes computer software that may be loaded into the memory 34 and executed by the processor 32. The computer software may generally be identified by modules, engines and similar types of systems in the memory 34. It will be understood that the computer software may be otherwise combined and/or segregated for processing within the scope of the present invention. Accordingly, labels of the software systems are for illustrative purposes and may be varied within the scope of the present invention.

The computer software may be loaded into the memory 34 from disk storage (not shown). Disk storage may include a variety of types of storage media. For example, disk storage may include floppy disk drives, hard disk drives, CD/ROM drives, or magnetic tape drives.

The memory 34 may include an operating system 36, a database 38, a server application 40 and a rendering engine 44. It will be understood that these systems may be otherwise stored within the scope of the present invention. For example, the database 38 and other systems may be stored on a separate, remote server and accessed via the network 26.

The operating system 36 may comprise a graphical user interface (GUI) 48. In this embodiment, the operating system 36 may be Macintosh OS, WINDOWS NT, WINDOWS 95, OS/2, or any other type of graphical operating system. It will be understood that other types of operating systems, including non-graphical operating systems, may be used within the scope of the present invention.

The database 38 may store weather information obtained from various local, regional, and continental databases of weather providers such as the National Weather Service. In one embodiment, such databases may include Regional Satellite, Regional Forecasts, Continental Radar, Continental Satellite, Continental Forecasts, Winds Aloft, Surface OB, METAR, TAF, NOTAMS, PWWs, AIREPs, AIRMETs, NWS Watches, Warnings and Advisories, SIGMETs, NWS Zone Forecasts, Local Radar, Analysis and Forecast, Maps and other Travel Advisories, Regional Radar Images and the like. Weather information from such databases may be downloaded to the database 38 of the server system 12 via the network 26. It will be understood that the weather information of the database 38 may be otherwise obtained and/or stored within in scope of the present invention.

In one embodiment, the database 38 may include satellite imagery 50, radar imagery 52, alpha-numeric weather 54 information and weather maps 56. In this embodiment, the satellite imagery 50 may comprise infrared and visual satellite imagery. The radar imagery 52 may comprise regional and composite radar imagery, including local radar. The alpha-numeric weather information 54 may comprise weather observations, forecasts and warnings. The weather maps 56 may comprise mapped weather patterns, formations and the like. It will be understood that the server system 12 and/or database 38 may comprise additional or different types of weather information within the scope of the present invention.

The server application 40 may operate as a dispatcher of requests and a conduit for data transfer. In the Internet embodiment, the server application 40 may be an HTTP server. In this embodiment, the server application 40 may comprise NETSCAPE ENTERPRISE manufactured by Netscape Communication Corporation, MICROSOFT EXPLORER manufactured by MicroSoft Corporation and the like. It will be understood that the server application 40 may comprise other types of applications within the scope of the present invention. For example, the server application may be a VRML server.

The server application 40 may receive requests for weather products associated with a travel route or selected location from the client systems 14. For the convenience of the reader, the present invention will be described in connection with weather products associated with a travel route. It will be understood that the weather products may be associated with a selected location, other point or groups of points of interest within the scope of the present invention. Such weather products may be provided by the system and methods described below in connection with providing weather products associated with the travel route.

As described in more detail below, the travel route may be uploaded as a route plan file 62. In one embodiment, the uploaded route plan file 62 may include a departure point 64, a destination point 66, and way points 68 defining the travel route. It will be understood that the requests and route plan file 62 may include additional or different information within the scope of the present invention. It will be further understood that the request for weather products associated with the travel route may be otherwise received by the server application within the scope of the present invention.

The requests may include product parameters listing the types of weather products selected by the client for the travel route. The product parameters may include a preset client profile and/or presently set parameters listing weather products desired by the client. The product parameters may also include architectural information about the client system 14 and the communication path between client system 14 and the server system 12. As is described in more detail below, this information may be used to determine products that should be downloaded to the client system 14 based on the capability of the client system 14 and the communication path between the client system 14 and the server system 12.

In response to requests for weather products associated with a travel route, the server application 40 may invoke a delivery engine 70 to retrieve and/or generate the selected weather products for the travel route. As described in more detail below, the delivery engine 70 may in combination with the rendering engine 44 retrieve weather data 74 associated with the travel route, generate visualizations 76 of forecast weather along the travel route using the weather data 74 and package the weather data and visualizations 74 and 76 for delivery to the client. It will be understood that the weather data 74 and visualization 76 may be otherwise retrieved, generated and/or packaged within the scope of the present invention.

In one embodiment, the delivery engine 70 may include a set of handlers 80 to retrieve weather data and carry out other functions of the delivery engine 70. The handlers 80 may include a route plan handler to generate a route points file 82 from the route plan file 62. The route points file 82 may include a plurality of route points along the travel route. Route point query handlers may conduct queries of weather databases for each route point to retrieve weather data associated with each route point. It will be understood that the delivery engine 70 may comprise other handlers 80 within the scope of the present invention. It will be further understood that the delivery engine 70 may otherwise carry out the functionality of the handlers 80 within the scope of the present invention.

The delivery engine 70 may translate or otherwise configure retrieved data to a format that may be used within the weather information system 10. The data may be historical, current and/or forecasted data. In one embodiment, the delivery engine 70 may include a text converter to convert alpha-numeric weather data. In this embodiment, the text converter may be programmed in "C" language. Converted text may pass through a HyperText Markup Language (HTML) generator to be converted to the HTML language for compatibility with the Web environment of the Internet. The HTML generator may be programmed in Pearl language. The handlers 80 may then prepare hyperlinks with which a client may conveniently access the retrieved weather data upon download. The handlers 80 may also prepare hyperlinks for satellite, radar and other imagery information. It will be understood that retrieved data may be otherwise translated, configured and/or processed within the scope of the present invention.

The rendering engine 44 may generate the visualizations 76 of forecasted weather along the travel route using the weather data 74 retrieved for each of the route points of the travel route. In one embodiment, the visualizations 76 may be dynamic fly-through simulations of forecasted or observed weather along the travel route. In this embodiment, the visualizations 76 generated by the rendering engine 44 may comprise a dynamic 2-dimensional (2D) fly-through and/or a dynamic 3-dimensional (3D) fly-through. The fly-throughs may be bit-mapped movies. It will be understood that the visualizations 76 may comprise additional or different representations of forecasted or observed weather and formats within the scope of the present invention. For example, the visualizations may be drive-through, on-location or other simulations of forecasted weather along the travel route.

The weather data 74 and visualization 76 may be packaged by the delivery engine 70 for delivery to the client system 14. The delivery engine 70 may also compress the weather package 84 to reduce the time and/or bandwidth required for delivery of the weather products to the client. It will be understood that the weather data 74 and visualization 76 may be otherwise compressed and/or packaged within the scope of the present invention. For example, the rendering engine 44 may compress the weather visualization 76 using MPEG or other video compression techniques within the scope of the present invention.

For the HTTP embodiment of the server application 40, the delivery engine 70 may comprise a common gateway interface (CGI) script. CGI is the standard interface for calling or executing programs on an HTTP server. In this embodiment, the rendering engine 44 may comprise REALITY 3-D manufactured by Earthwatch Communications, Inc. of Minnetonka, Minn. Further description of the operation of the rendering engine 44 to generate these weather visualizations 76 may be found in U.S. Pat. No. 5,379,215 to Kruhoeffer, et al., entitled "Method for Creating a 3-D Image of Terrain and Associated Weather" and assigned to Earthwatch Communications, Inc. It will be understood that the delivery engine 70 and rendering engine 44 may comprise other types of scripts and/or programs within the scope of the present invention.

The client system 14 may be similar to the server system 12 and may be implemented using virtually any type of computer. Thus, the client system 14 may be a personal computer, file server, work station, minicomputer, mainframe, or any other computer capable of communicating and interacting with other computers. In a particular embodiment, the client system 14 may be a portable laptop computer having a 486, Pentium or other fast processor.

The client systems 14 may each comprise an input/output system 100, a processor 102, and a memory 104. As previously described, the input/output system 100 may connect the communication links 16 and other input and output devices to the client system 14.

The client system 14 includes computer software that may be loaded and/or downloaded into the memory 104 and executed by the processor 102. The computer software may generally be identified by modules, tables, files and similar systems in memory 104. It will be understood that the computer software may be otherwise combined and/or segregated for processing within the scope of the present invention. Accordingly, the labels of the software systems are for illustrative purposes and may be varied within the scope of the present invention.

As previously described in connection with the memory 34, computer software may be loaded in the memory 104 from disk storage (not shown). Disk storage may include a variety of types of storage media. For example, disk storage may include floppy disk drives, hard disk drives, CD/ROM drives, or magnetic tape drives.

The memory 104 may include an operating system 110, a travel points table 112, a browser 114 and a viewer 116. The operating system 110 may include a graphical user interface (GUI) 118. In this embodiment, the operating system 110 may be Macintosh OS, WINDOWS NT, WINDOWS 95, OS/2, or any other graphical operating system. It will be understood that the operating system 110 may be any type of system capable of allowing graphics to be displayed on the client system 14.

As described in more detail below, the travel points table 112 may be used in conjunction with the browser 114 to assist the client in entering a travel route. The travel route may be a flight path, a shipping lane, a truck route or the like. For the convenience of the reader, the travel route will be described as a flight path. It will be understood that the travel route may be any type of route used in connection with a form of transportation effected by the weather.

In one embodiment, the travel points table 112 may comprise a plurality of travel points 120. The travel points 120 may be departure and destination points of the travel route. Where the travel route is a flight plan, the travel points may be airports at which the client may depart and arrive. In this embodiment, each airport travel point 120 may include an International Civil Aviation Organization (ICAO) designation and positioning information such as a latitude 122, longitude 124 and altitude 126 of that airport. It will be understood that the travel points table 112 may include additional or different information within the scope of the present invention. For example, in a trucking embodiment the departure and destination travel points may be terminals for truckers.

The browser 114 may receive a travel route and product selections from the client and upload the travel route and product selections to the server system 12. In one embodiment, the browser 114 may include a route planner 132 to assist the client in entering the travel route. The route planner 132 may display an interface 134 including a plurality of selectable travel points. Each travel point of the interface 134 may be linked or otherwise associated with a travel point 120 of the travel points table 112. Accordingly, the route planner 132 and interface 134 may assist the client in entering a travel route by displaying selectable departure and destination points and retrieving information associated with selected departure and destination points. As a result, the client need not remember, look up, or manually enter departure and destination points and information associated with those points.

Figure 3:
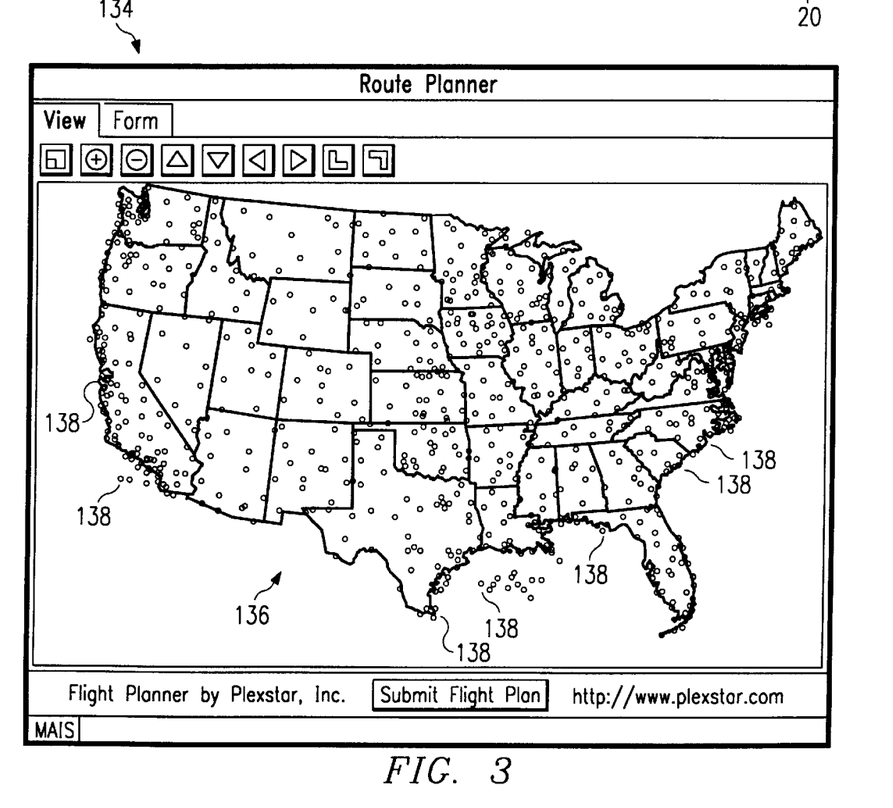
FIG. 3 is a screen display illustrating an interactive map with which a client may intuitively enter a travel route in accordance with one embodiment of the present invention.

In one embodiment, the interface 134 may comprise an interactive map 136 as shown by FIG. 3. Referring to FIG. 3, the map 136 may graphically display travel points 138. The client may select travel points 138 using an input device such as a mouse, trackpad, or the like. It will be understood that the interface 134 may comprise other displays from which the client may select travel points. For example, interface 134 may be a list of selectable travel points.

As described in more detail below, in response to selection of a travel point, the interface 134 may display a dialog box for the client to enter departure and/or arrival times at that travel point. Additionally, interface 134 may display a dialog box for the client to enter way points and times between the departure and destination points. Where the travel route is a flight plan, the way points may include altitude information. It will be understood that the interface may otherwise interact with the client within the scope of the present invention.

The route planner 132 may store the travel route entered by the client into the route plan file 140. Thus, the route plan file 140 may include a departure point 142, a destination point 144 and way points 146 of a travel route. The route plan file 140 may be uploaded by the browser 114 to the server system 12 as the travel route. It will be understood that the route plan file 140 may comprise additional or different information within the scope of the present invention. It will be further understood that the travel route may be otherwise uploaded to the server system 12 within the scope of the present invention.

The browser 114 may also receive a download weather package 148 from the server system 12. As previously described in connection with the weather package 78 on the server system 12, the downloaded weather package 148 may comprise weather data 150 associated with the travel route and visualizations 152 along the travel route uploaded to the server system 12. As previously described, the weather data may comprise satellite and radar imagery, weather maps, and alpha-numeric information retrieved by the server system 12. In one embodiment, the weather visualizations 152 may comprise dynamic fly-throughs generated by the server system 12. It will be understood that the visualizations 152 may comprise dynamic drive-throughs and the like within the scope of the present invention.

The browser 114 may also in connection with the server application 40 establish an audio link between the client system 14 and the expert station 24. The browser 114 and server application 40 may transmit and receive audio information between the client system 14 and expert station 24 while the audio link is in place. The browser 114 and server application 40 may further cooperate to upload a displayed weather hazard from the client system 14 to the expert station 24 to enable a meteorologist or other expert to view the weather hazard that the client wishes to discuss. The weather hazard may be a dangerous weather formation or any other type of weather phenomena.

For the Internet embodiment, the browser 114 may be NETSCAPE NAVIGATOR, version 3.0 manufactured by Netscape Communication Corporation, MICROSOFT EXPLORER manufactured by MicroSoft Corporation and the like. In this embodiment, the route planner 132 may comprise a Java applet loaded into the browser 114 each time the browser 114 is used. The map 136 may comprise a MAPIORI application manufactured by PlexStar. It will be understood that other browsers, route planner and/or interface may be used within the scope of the present invention.

The viewer 116 may be called by the browser 114 to display the weather data 150 and/or visualizations 152 of the downloaded weather package 148. In displaying the weather data 150 and visualization 152, the viewer 116 may decompress compressed files such as the bit map movies generated by the rendering engine 44. In one embodiment, the viewer 116 may comprise QUICK TIME manufactured by Apple Corporation. It will be understood that the viewer 116 may comprise other applications, programs, and/or extensions capable of displaying the weather data 150 and/or visualizations 152 of the downloaded weather package 148.

Figure 4:
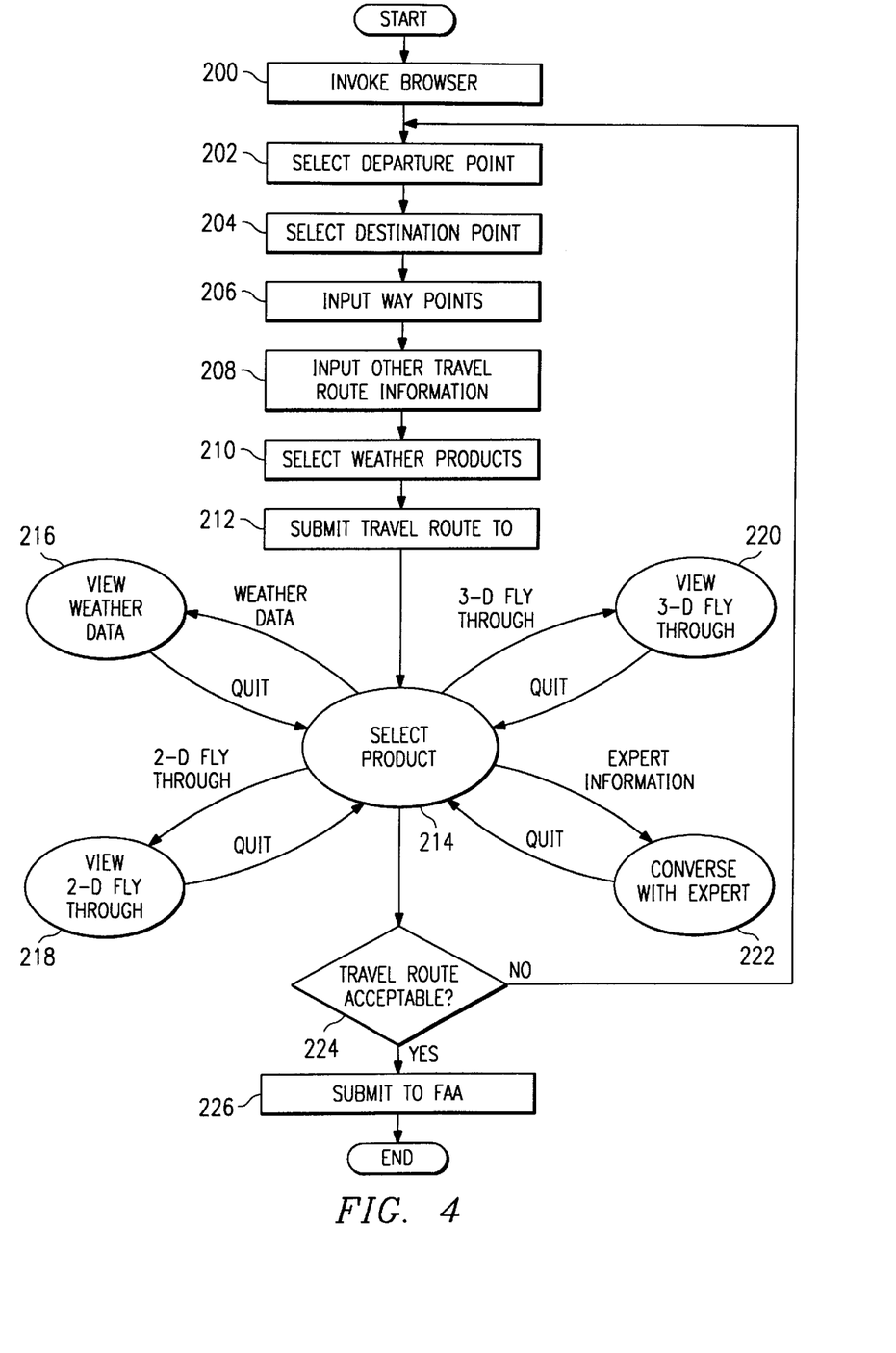
FIG. 4 is a flow diagram from a client's perspective illustrating the process of obtaining weather information along a travel route in accordance with one embodiment of the present invention.

Referring to FIGS. 4–9, the method of the present invention will now be described. FIG. 4 illustrates a client process for entering a travel route and viewing weather products associated with that travel route in accordance with one embodiment of the present invention. The process begins at step 200 in which the client invokes the browser 114. It will be understood that the user may invoke another application or program to begin the process within the scope of the present invention.

In response, as described in more detail below, the browser 114 may invoke the route planner 132 to display the interface 134 including selectable travel points. The interface 134 may be the interactive map 136 of FIG. 3. The interactive map 136 may graphically display travel points 138 for selection by the client.

Proceeding to step 202, the client may select a departure point. In the interactive map 136 embodiment, the client may select the departure point by clicking or otherwise activating the appropriate travel point 138 on the interactive map 136 using an input device such as mouse, trackpad or the like. In response to the selection of a travel point 138, the route planner 132 may display a dialog box in which the client may enter a scheduled departure time and/or other related information. It will be understood that the client may otherwise select or enter a departure point within the scope of the present invention.

Next, at step 204, the client may select a destination point. As previously described in connection with the departure point, the client may select a destination point by clicking or otherwise activating the appropriate travel point 138 on interactive map 136 using an input device. In response to the selection of a destination point, the route planner 132 may display a dialog box in which the client may enter a scheduled arrival time and/or other related information. It will be understood that the client may otherwise select or enter a destination point within the scope of the present invention.

At step 206, the client may input one or more way points. The way points may include position and time information. Additionally, for a flight plan, the way points may include altitude information. It will be understood that way points may comprise other information or be otherwise entered by the client within the scope of the present invention.

Proceeding to step 208, the client may input other travel route information. For a flight plan, this information may include the type of aircraft to be flown. This information may be used to determine automatic climb and descent rates and thus obtain altitude information for way points between the departure and destination points.

Next, at step 210, the client may select desired weather products. As previously described, the weather products may include weather data such as satellite and radar imagery, alpha-numeric information and weather maps and weather visualizations such as 2-D and 3-D fly-throughs. This information may be selected on-the-fly by the client each time a travel route is entered. It will be understood that weather products may be otherwise selected by the client within the scope of the present invention. For example, the product information may be stored as a product parameters file, in which case products need not be reselected in connection with each travel route.

Proceeding to step 212, the client may submit the travel route. As previously described, the browser 114 may upload the travel route to the server system 12 as the route plan file 62. As described in more detail below, the server system 12 may process the travel route, retrieve and/or generate selected weather products and download the weather products to the client system 14. Next, at state 214, the browser 114 of the client system 14 may display a list of the downloaded weather products for selection and viewing by the client.

At state 214, the client may select weather products for viewing. Upon a selection of weather data, the WEATHER DATA branch of state 214 may lead to state 216. At state 216, the browser 114 may display the weather data 150 downloaded from the server system 12 for viewing by the client. As previously described, the weather data 150 may include satellite and radar imagery, alpha-numeric weather information and weather maps. It will be understood that the weather data 150 may comprise other types of information within the scope of the present invention.

Figure 5:
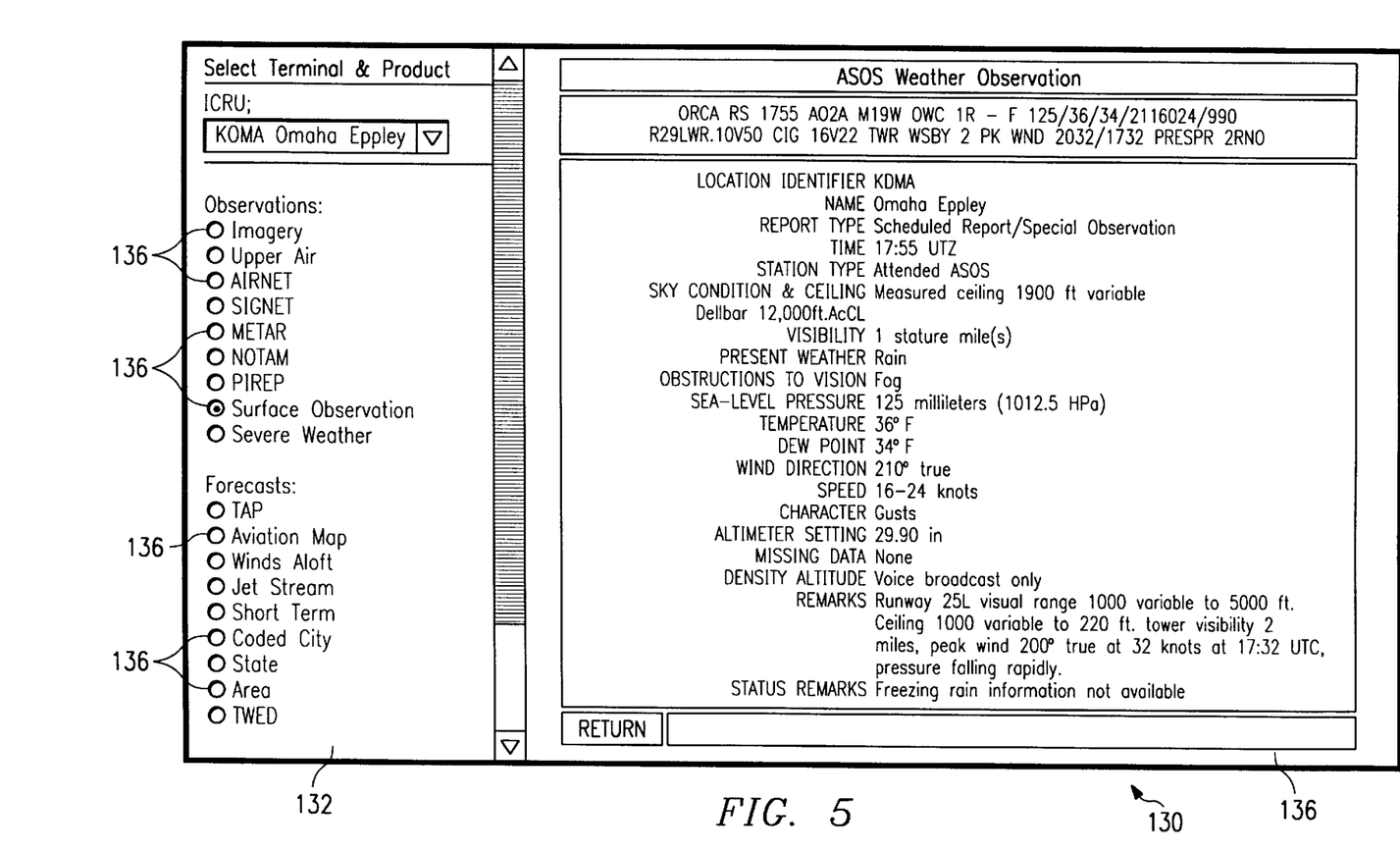
FIG. 5 is a screen display illustrating weather data products including alpha-numeric data in accordance with one embodiment of the present invention.

FIG. 5 is a screen display 130 of weather data products in accordance with one embodiment of the present invention. Referring to FIG. 5, the display 130 may include a listing 132 of available weather data products 134. The client may select these products 134 to view the associated information in the remaining portion of the screen 136. It will be understood that the weather data may be otherwise displayed and/or viewed within the scope of the present invention.

In FIG. 5, surface observation weather data is selected for display in the main portion of the screen 136. As shown by FIG. 5, the surface observation weather data is alpha-numeric data and includes a location identifier, time, sky condition and ceiling, visibility, present weather, obstructions to vision, sea-level pressure, temperature, dew point, wind direction, speed and character, altimeter setting, density altitude and remarks. It will be understood that the surface observation and other weather data may comprise other information within the scope of the present invention.

Figure 6:
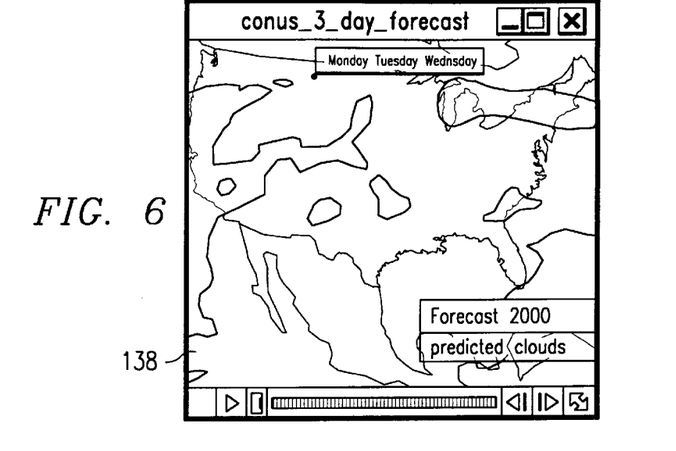
FIG. 6 is a screen display illustrating mapped weather data in accordance with one embodiment of the present invention.

FIG. 6 is a screen display illustrating mapped weather data 138 in accordance with one embodiment of the present invention. As shown by FIG. 6, the mapped weather data 138 may comprise forecasted weather conditions such as cloud cover. It will be understood that the mapped weather data 138 may also comprise current weather conditions. It will be further understood that mapped weather data may comprise other types of weather information such as current or forecasted weather patterns within the scope of the present invention.

After the client has viewed the weather data, the QUIT branch of state 216 may return to state 214 wherein the list 132 of downloaded weather products 136 is displayed by the browser 114 for selection by the client.

At state 214, upon a selection of the 2-D fly-through by the client, the 2-D FLY-THROUGH branch may lead to state 218. At state 218, the browser 114 may in connection with the viewer 116 display the 2-D fly-through to the client. As previously described, the 2-D fly-through may comprise a bit-mapped movie. It will be understood that the 2-D fly-through may be otherwise viewed by the client within the scope of the present invention.

Figure 7:
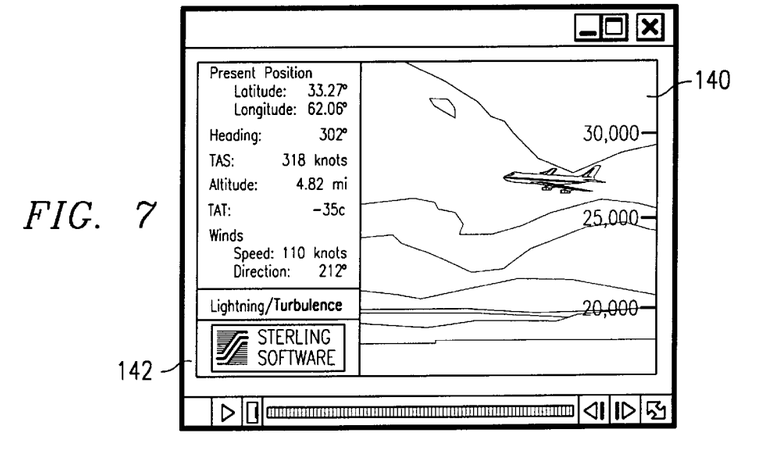
FIG. 7 is a screen display illustrating a scene of a dynamic two-dimensional (2D) fly-through in accordance with one embodiment of the present invention.

FIG. 7 is a screen display illustrating a scene of the 2-D fly-through in accordance with one embodiment of the present invention. Referring to FIG. 7, the 2-D fly-through may include a visualization 140 of forecasted weather along the travel route and associated information 142. For a flight plan, the associated information 142 may include heading, altitude, wind speed and direction, and the like. It will be understood that the 2-D fly-through may include other information and be otherwise displayed within the scope of the present invention. After the client has viewed the 2-D fly-through, the QUIT branch of state 218 may return to state 214 wherein the list 132 of downloaded weather products 136 is displayed by the browser 114 for selection by the client.

At state 214, upon selection of a 3-D fly-through by the client, the 3-D FLY-THROUGH branch of state 214 may lead to state 220. At state 220, the browser 114 may in connection with the viewer 116 display the 3-D fly-through to the client. As previously described, the 3-D fly-through may be a bit-mapped movie. It will be understood that the 3-D fly-through may be otherwise selected by the client within the scope of the present invention.

Figure 8:
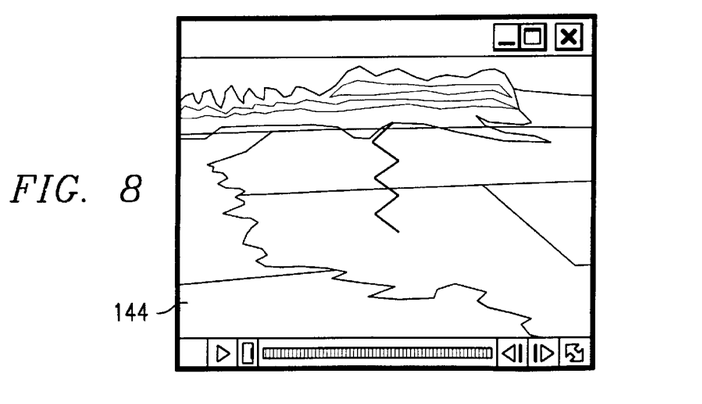
FIG. 8 is a screen display illustrating a scene of a three-dimensional (3D) fly-through in accordance with one embodiment of the present invention.

FIG. 8 is a screen display illustrating a scene of a 3-D fly-through in accordance with one embodiment of the present invention. Referring to FIG. 8, the 3-D fly-through may include a visualization 144 of forecasted weather along the travel route. The visualization 144 may show weather formations, rain and other information along the travel route as it would appear to a pilot in a cockpit. It will be understood that the 3-D fly-through may include other information and be otherwise displayed within the scope of the present invention. After the client has viewed the 3-D fly-through, the QUIT branch of state 220 may return to state 214 wherein the list 132 of downloaded weather products 136 is displayed by the browser 114 for selection by the client.

At state 214, upon the selection of expert information, the EXPERT INFORMATION branch may lead to state 222. As described in more detail below, the browser 114 may in connection with the server application 40 establish an audio link between the client system 14 and the expert station 24. The browser 114 may also upload a displayed weather hazard to the expert station 24 to allow a meteorologist or other expert to view the weather hazard that the client wishes to discuss. While the audio link is in place at state 222, the client may converse with the expert about the displayed weather hazard. After the client has finished conversing with the expert, the QUIT branch of state 222 may return to state 214 wherein the list 132 of downloaded weather products 136 is displayed by the browser 114 for selection by the client.

After the client has reviewed the weather data and visualizations, the client may at decisional step 224 determine whether the travel route is acceptable. A travel route may not be acceptable if the weather hazards are too great to fly or otherwise travel through. If the travel route is not acceptable, the NO branch of decisional step 224 may return to step 202 from which the client may enter an alternate travel route. If the travel route is acceptable, the YES branch of decisional step 224 may lead to step 226. At step 226, in the case of air travel the client may submit the flight plan travel route to the Federal Aviation Administration (FAA) for approval. It will be understood that the flight plan may be otherwise submitted to the FAA within the scope of the present invention. Step 226 leads to the end of the process.

Figure 9:
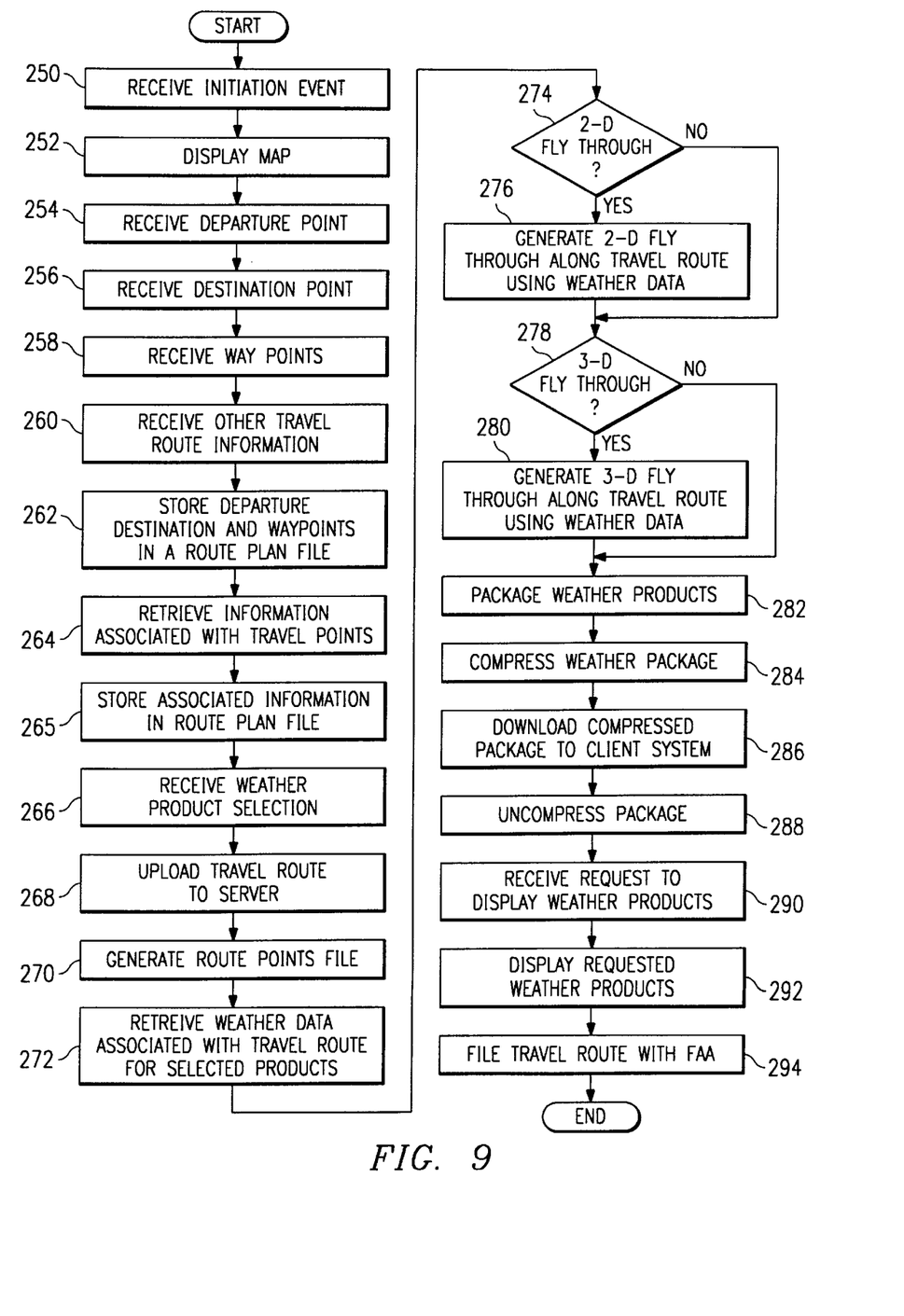
FIG. 9 is a flow diagram illustrating a method of providing weather data and weather visualizations along a travel route in accordance with one embodiment of the present invention.

FIG. 9 is a flow diagram illustrating a method of providing weather data and weather visualizations along a travel route in accordance with one embodiment of the present invention. The method begins at step 250 when the weather information system 10 receives an initiation event. As previously described, the initiation event may be the activation of the browser 114 by the client. It will be understood that the method of providing weather data and weather visualizations along the travel route may be otherwise invoked within the scope of the present invention.

Proceeding to step 252, the browser 114 may invoke the route planner 132 to display the interactive map 126. At step 254, the route planner 132 may use the interactive map 126 to receive a destination point. At step 256, the route planner 132 may again use the interactive map 126 to receive a destination point. As previously described, the route planner 132 may receive the departure and destination points from selections on the interactive map 126 by the client.

Next, at step 258, the route planner 132 may receive way points between the departure and destination points. As previously described, the way points may include time and altitude information for a flight path. At step 260, the route planner 132 may receive other travel route information. For a flight path, this information may include the type of aircraft to be flown along the travel route.

Proceeding to step 262, the route planner 132 may store the departure, destination and way points in the route plan file 140. At step 264, the route planner 132 may retrieve information associated with the travel points from the travel points table 112. As previously described, this may include positioning information such as latitude 122 and longitude 124 and altitude information 126. The associated information may be stored at step 265 in the route plan file 140. It will be understood that the travel points and associated information may be otherwise stored within the scope of the present invention.

Next, at step 266, the browser 114 may receive a selection of weather products. As previously described, the weather products may be selected on-the-fly by the client or may be part of a preset product parameters file. It will be understood that the weather products may be otherwise received within the scope of the present invention.

Proceeding to step 268, the browser 114 may upload the route plan file 140 and products parameters to the server system 12 as the travel route. In response to receipt of the travel route, the server application 40 of the server system 12 may invoke the delivery engine 70 to process the request for weather products associated with the travel route.

At step 270, the delivery engine 70 may use the handlers 80 to generate the route points file 78 using the uploaded route plan file 62. As previously described, the route points file 78 may comprise a plurality of points along the travel route. For a flight path, the route points file 78 includes a route point for each 50 nautical mile section of the travel route. It will be understood that the route points file 78 may be otherwise generated within the scope of the present invention. It will be further understood that the route points file 78 may include different distributions of route points within the scope of the present invention. For example, the distribution may vary depending on the resolution of the weather data and the form of travel.

Proceeding to step 272, the delivery engine 70 may use the handlers 80 to query the database 38 and/or weather databases to other retrieved weather data 78 associated with each route point of the route points file 78. As previously described, the delivery engine may translate alpha-numeric and/or imagery weather data for compatibility with the weather information system 10.

Next, at decisional step 274, the delivery engine 70 may determine if the client selected a 2-D fly-through for the travel route. This may be determined by the product parameters. If the client selected a 2-D fly-through, the YES branch of decisional step 274 leads to step 276. At step 276, the rendering engine 44 may generate the 2-D fly-through along the travel route. In one embodiment, the rendering engine 44 may use the weather data 74 retrieved for each of the route points to generate the 2-D fly-through. In this embodiment, the rendering engine 44 may comprise REALITY 3-D manufactured by Earthwatch Communications, Inc. It will be understood that the 2-D fly-through may be otherwise generated within the scope of the present invention. Step 276 leads to decisional step 278. Returning to decisional step 274, if a 2-D fly-through was not selected by the client, the NO branch of decisional step 274 also leads to decisional step 278.

At decisional step 278, the delivery engine 70 may determine if the client selected a 3-D fly-through for the travel route. As previously described, this may be determined by the product parameters. If the client selected a 3-D fly-through, the YES branch of decisional step 278 leads to step 280. At step 280, the rendering engine 44 may generate the 3-D fly-through along the travel route. In one embodiment, the rendering engine 44 may use the weather data 74 associated with each of the route points to generate the 3-D fly-through. In this embodiment, the rendering engine 44 may comprise REALITY 3-D manufactured by Earthwatch Communications, Inc. It will be understood that the 3-D fly-through may be otherwise generated within the scope of the present invention. Step 280 leads to step 282. Returning to decisional step 278, if a 3-D fly-through was not selected by the client, the NO branch of decisional step 278 also leads to step 282.

Proceeding to step 282, the delivery engine 70 may package the weather products 74 and 76 to be downloaded over the network 26 to the client system 14. As previously described, the weather products 74 and 76 may include weather data such as satellite and radar imagery and alpha-numeric weather information and weather visualizations such as 2-D and 3-D fly-throughs. Next, at step 284, the delivery engine 70 may compress the weather package 84 to minimize time and resources required to deliver the products to the client over the network 26. At step 286, the server application 40 may download the weather package 82 to the browser 114 of the client system 14. As previously described, the weather package 82 may be downloaded over the Internet using standard Internet protocols such as HTTP, VRML, TCP/IP and the like.

Proceeding to step 288, the browser 114 may uncompress the downloaded weather package 148. At step 290, the browser 114 may receive a request to display the downloaded weather products. In response, at step 292, the browser 114 in connection with the viewer 116 may display the weather products downloaded from the server system 12. The client may review the downloaded weather products to determine weather conditions along the travel route and to view those conditions. After the client has reviewed the weather data and visualizations along the travel route, the client may at step 294, in the case of a flight path, file a flight plan with the FAA. In this embodiment, the browser 114 may transmit the flight plan to the DUATS system currently used by the FAA. It will be understood that the flight plan may be otherwise filed within the scope of the present invention. Step 294 leads to the end of the process.

Accordingly, graphical information and visualizations that stimulate the formation of mental images of weather conditions and other weather data along a travel route may be easily and conveniently obtained by remote client. Additionally, the travel route may be intuitively entered by simply selecting departure and destination points on an interactive map.

As previously described, the method and systems described in connection with weather products associated with a travel route may also provide weather products associated with a selected location. In one embodiment, a client system may be an interactive TV. The client system may receive and upload the selected location over a network to the server. The network may include part of an interactive TV network and the server may be capable of interacting with an interactive TV network. It will be understood that another type of system may be used within the scope of the present invention.

The server may automatically retrieve weather data associated with the selected location and generate visualizations of weather at the selected location using the weather data. The weather data may be historical, current and/or forecasted data. The visualizations may be simulations of historical, current, forecasted or observed weather at the location. The server may download the weather data and visualizations over the network to the client system for display.

Accordingly, graphical information and visualizations that stimulate the formation of mental images of weather conditions and other weather data at the selected location may be easily and conveniently obtained by a remote client using interactive TV. Moreover, the location may be intuitively entered by simply selecting one or more points on an interactive map as previously described in connection with a travel route.

Although the present invention has been described with several embodiments, various changes and modifications may be suggested to one skilled in the art. It is intended that the present invention encompass such changes and modifications as fall within the scope of the appended claims.

What is claimed is:

1. A method of providing weather information along a travel route, comprising the steps of:

receiving a travel route;

automatically retrieving weather data associated with the travel route; and automatically generating a dynamic simulation of weather along the travel route using the weather data.

2. The method of claim 1, further comprising the steps of:

generating a plurality of route points along the travel route;

automatically retrieving weather data associated with each route point; and automatically generating a dynamic simulation of weather for each route point using the weather data associated with that route point.

3. The method of claim 1, further comprising the step of downloading the dynamic simulation over a network to a client system.

4. The method of claim 3, wherein the network is the Internet.

5. The method of claim 1, further comprising the steps of:

compressing the dynamic simulation; and downloading the compressed dynamic simulation over a network to a client system.

6. The method of claim 3, further comprising the step of displaying the dynamic simulation on the client system.

7. The method of claim 1, further comprising the step of downloading the weather data and dynamic simulation over a network to a client system.

8. The method of claim 7, wherein the network is the Internet.

9. The method of claim 1, further comprising the steps of:

compressing the weather data and dynamic simulation; and downloading the compressed weather data and dynamic simulation over a network to a client system.

10. The method of claim 1, the step of receiving the travel route further comprising the steps of:

receiving the travel route at a client system; and uploading the travel route over a network to a server system.

11. The method of claim 10, wherein the network is the Internet.

12. The method of claim 1, the step of receiving the travel route further comprising the steps of:

receiving a departure point at a client system;

retrieving information associated with the departure point at the client system;

receiving a destination point at the client system; and retrieving information associated with the destination point at the client system.

13. The method of claim 1, the step of receiving the travel route further comprising the steps of:

receiving a departure point; and receiving a destination point.

14. The method of claim 1, the step of receiving the travel route further comprising the steps of:

receiving a departure point;

receiving a destination point; and receiving a way point between the departure point and the destination point.

15. The method of claim 1, the step of receiving the travel route further comprising the steps of:

graphically displaying a map having a plurality of interactive travel points;

receiving a selection of a first travel point of the map; and receiving a selection of a second travel point of the map.

16. The method of claim 1, the step of receiving the travel route further comprising the steps of:

graphically displaying a map having a plurality of interactive travel points;

receiving a selection of a first travel point of the map;

receiving a selection of a second travel point of the map; and receiving a way point between the first travel point and the second travel point.

17. The method of claim 1, wherein the travel route is a flight path, the step of receiving a travel route further comprising the steps of:
    receiving a departure airport; and
    receiving a destination airport.

18. The method of claim 1, wherein the travel route is a flight path, further comprising:
    the step of receiving a travel route further comprising the steps of:
        receiving a departure airport;
        receiving a destination airport;
        receiving a flight altitude; and
    the step of automatically generating a dynamic simulation of weather along the travel route comprising generating the dynamic simulation of weather at the flight altitude.

19. The method of claim 1, the step of automatically retrieving weather data associated with the travel route further comprising the step of automatically retrieving alpha-numeric weather data associated with the travel route.

20. The method of claim 1, the step of automatically retrieving weather data associated with the travel route further comprising the step of automatically retrieving satellite imagery associated with the travel route.

21. The method of claim 20, wherein the satellite imagery comprises visual satellite imagery.

22. The method of claim 20, wherein the satellite imagery comprises infrared satellite imagery.

23. The method of claim 1, the step of automatically retrieving weather data associated with the travel route further comprising the step of automatically retrieving radar imagery associated with the travel route.

24. The method of claim 23, wherein the radar imagery comprises at least one local radar imagery.

25. The method of claim 23, wherein the radar imagery comprises composite radar imagery.

26. The method of claim 1, the step of automatically retrieving weather data associated with the travel route further comprising the step of retrieving weather observation data associated with the travel route.

27. The method of claim 1, the step of automatically generating the dynamic simulation along the travel route using the weather data further comprising the step of generating a dynamic fly-through using the weather data.

28. The method of claim 1, the step of automatically generating the dynamic simulation along the travel route using the weather data comprising the step of generating a dynamic two-dimensional (2D) fly-through using the weather data.

29. The method of claim 1, the step of automatically generating the dynamic simulation along the travel route using the weather data comprising the step of generating a dynamic three-dimensional (3D) fly-through using the weather data.

30. The method of claim 1, further comprising the steps of:
    receiving a request for expert information; and
    establishing an audio link with an expert station.

31. The method of claim 1, further comprising the steps of:
    receiving from a client system a request for expert information concerning a displayed weather hazard;
    establishing an audio link between the client system and an expert station; and
    uploading the displayed weather hazard to the expert station.

32. A server system for providing weather information along a travel route, comprising:
    a server browser operable to receive a travel route over a network;
    a display engine operable to automatically retrieve weather data associated with the travel route; and
    a rendering engine operable to automatically generate a dynamic simulation of weather along the travel route using the weather data.

33. The server system of claim 32, further comprising:
    the display engine operable to generate a plurality of route points along the travel route;
    the display engine operable to automatically retrieve weather data associated with each route point; and
    the rendering engine operable to automatically generate a dynamic simulation of weather for each route point using the weather data associated with that route point.

34. The server system of claim 32, further comprising:
    the server browser operable to download the weather data over the network to a client system; and
    the server browser operable to download the dynamic simulation over the network to the client system.

35. The server system of claim 32, the network further comprising the Internet.

36. The server system of claim 32, further comprising:
    the display engine operable to compress the weather data; and
    the display engine operable to compress the dynamic simulation.

37. The server system of claim 32, wherein the weather data comprises alpha-numeric weather data associated with the travel route.

38. The server system of claim 32, wherein the weather data comprises satellite imagery associated with the travel route.

39. The server system of claim 32, wherein the weather data comprises radar imagery associated with the travel route.

40. The server system of claim 32, wherein the weather data comprises weather observation data associated with the travel route.

41. The server system of claim 32, wherein the dynamic simulation comprises a dynamic fly-through.

42. The server system of claim 32, wherein the dynamic simulation comprises a dynamic two-dimensional (2D) fly-through.

43. The server system of claim 32, wherein the dynamic simulation comprises a dynamic three-dimensional (3D) fly-through.

44. The server system of claim 32, further comprising an expert station operable to be connected to a client system via the server system.

45. A system for providing weather information along a travel route, comprising:
    a client system operable to receive a travel route;
    the client system operable to upload the travel route over a network to a server system, comprising:
    a display engine operable to automatically retrieve weather data associated with the travel route;
    a rendering engine operable to automatically generate a dynamic simulation of weather data along the travel route using the weather data; and
    a server application operable to download the weather data and dynamic simulation over the network to the client system.

46. The system of claim 45, further comprising:
    the client system operable to display the weather data; and the client system operable to display the dynamic simulation.

47. The system of claim 45, the client system further comprising a browser to upload the travel route over the network to the server system.

48. The system of claim 46, the client system further comprising a viewer to display the dynamic simulation.

49. The system of claim 45, the client system further comprising an interface to receive the travel route.

50. The system of claim 49, further comprising:
the interface operable to receive a departure point;
the interface operable to retrieve information associated with the departure point;
the interface operable to receive a destination point;
the client system operable to retrieve information associated with the destination point;
the client system operable to store the departure and destination points and associated information as a travel route; and
the client system operable to upload the travel route over the network to the server system.

51. The system of claim 49, further comprising:
the interface operable to receive a departure point; and
the interface operable to receive a destination point.

52. The system of claim 49, further comprising:
the interface operable to receive a departure point;
the interface operable to receive a destination point; and
the interface operable to receive a way point between the departure point and the destination point.

53. The system of claim 49, further comprising:
the interface comprising a map displaying a plurality of interactive travel points;
the map operable to receive a selection of a first travel point of the map; and
the map operable to receive a selection of a second travel point of the map.

54. The system of claim 49, further comprising:
the interface comprising a map displaying a plurality of interactive travel points;
the map operable to receive a selection of a first travel point of the map;
the map operable to receive a selection of a second travel point of the map; and
the map operable to receive a way point between the first travel point and the second travel point.

55. The system of claim 49, wherein the travel route is a flight path, further comprising:
the interface operable to receive a departure airport; and
the interface operable to receive a destination airport.

56. The system of claim 49, wherein the travel route is a flight path, further comprising:
the interface operable to receive a departure airport;
the interface operable to receive a destination airport;
the interface operable to receive a flight altitude; and
automatically generating the dynamic simulation of weather at the flight altitude.

57. The system of claim 45, wherein the weather data comprises alpha-numeric weather data associated with the travel route.

58. The system of claim 46, wherein the weather data comprises satellite imagery associated with the travel route.

59. The system of claim 45, wherein the weather data comprises radar imagery associated with the travel route.

60. The system of claim 45, wherein the weather data comprises weather observation data associated with the travel route.

61. The system of claim 45, wherein the dynamic simulation comprises a dynamic fly-through.

62. The system of claim 45, wherein the dynamic simulation comprises a dynamic two-dimensional (2D) fly-through.

63. The system of claim 45, wherein the dynamic simulation comprises a dynamic three-dimensional (3D) fly-through.

64. The system of claim 45, further comprising an expert station operable to be connected to the client system via the server system.

65. A method of providing weather information for a location, comprising the steps of:
receiving a location;
automatically retrieving weather data associated with the location; and
automatically generating a dynamic simulation of weather at the location using the weather data.

66. The method of claim 65, further comprising the steps of:
generating at least one point for the location;
automatically retrieving weather data associated with each point; and
automatically generating a dynamic simulation of weather for each point using the weather data associated with that point.

67. The method of claim 65, further comprising the step of downloading the weather data and dynamic simulation over a network to a client system.

68. The method of claim 67, wherein the client system comprises an interactive TV.

69. The method of claim 65, further comprising the steps of:
compressing the weather data and dynamic simulation; and
downloading the compressed weather data and dynamic simulation over a network to a client system.

70. The method of claim 65, the step of receiving the location further comprising the steps of:
receiving the location at a client system; and
uploading the location over a network to a server system.

71. The method of claim 65, the step of receiving the location further comprising the steps of:
graphically displaying a map having a plurality of interactive points; and
receiving a selection of a point of the map.

72. The method of claim 65, further comprising the steps of:
receiving a request for expert information; and
establishing an audio link with an expert station.

73. The method of claim 65, further comprising the steps of:
receiving from a client system a request for expert information concerning a displayed weather hazard;
establishing an audio link between the client system and an expert station; and
uploading the displayed weather hazard to the expert station.

* * * * *